Aug. 18, 1959
W. T. CHATER
2,900,534
PHASE DISCRIMINATOR
Filed Sept. 30, 1957
2 Sheets-Sheet 2
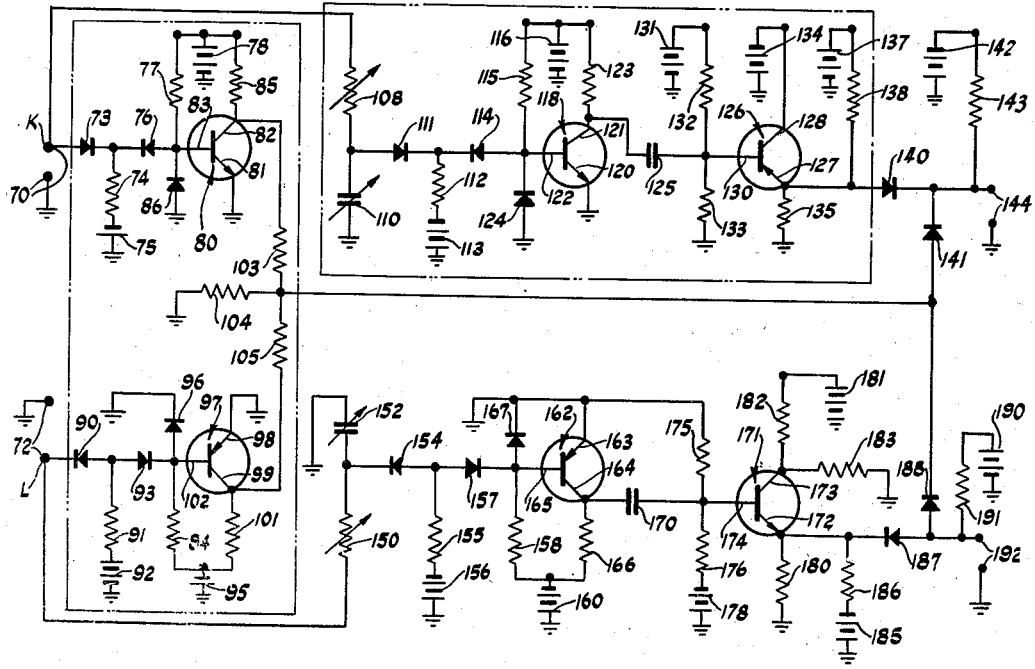
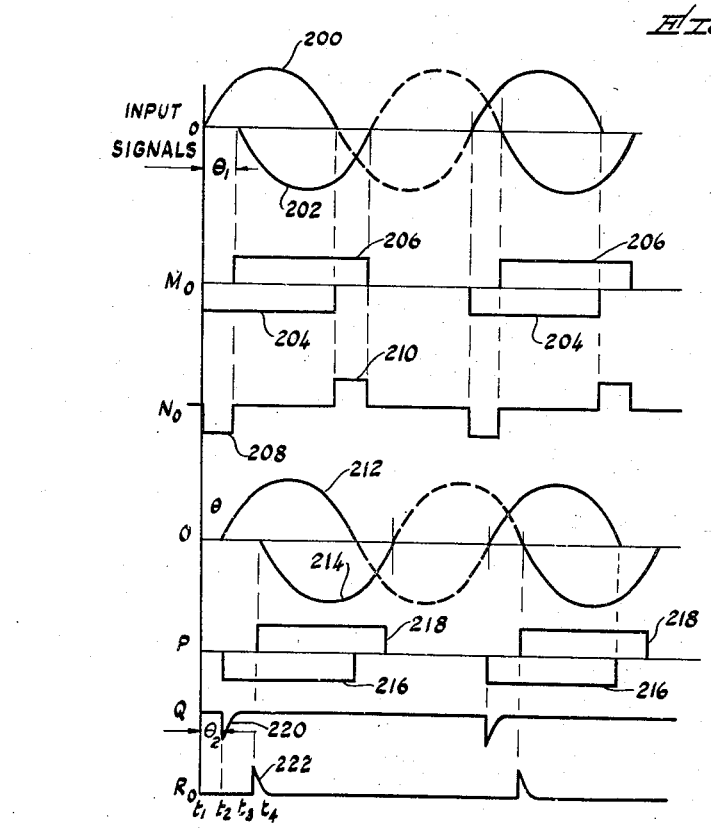
INVENTOR,
WILLIAM T. CHATER
BY Harold L. Jackson
ATTORNEY United States Patent Office 2,900,534
Patented Aug. 18, 1959

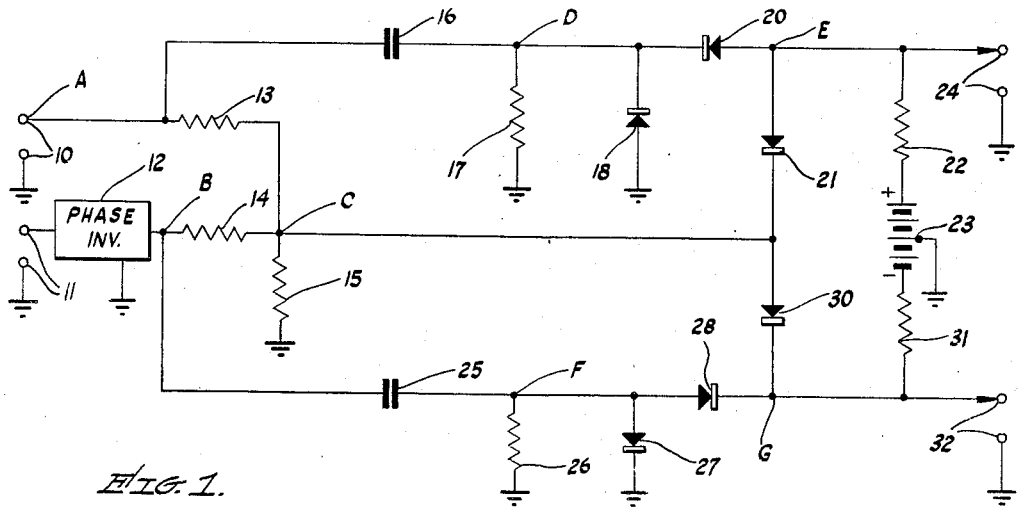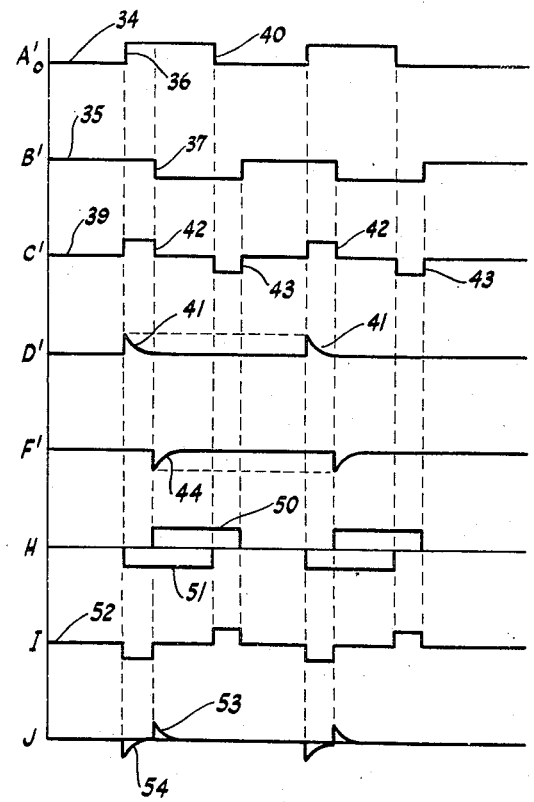

2,900,534

PHASE DISCRIMINATOR

William T. Chater, El Segundo, Calif., assignor to Hughes Aircraft Company, Culver City, Calif., a corporation of Delaware Application September 30, 1957, Serial No. 686,911

6 Claims. (Cl. 307—88.5)

The present invention relates to phase discriminators, and more particularly to a phase discriminator which provides a pulse-type output signal that is indicative of the relative phase relationship of two electrical waves.

In the past, phase discriminators have often employed transformers for determining the relative phase relationship between two electrical sine waves. The transformers derive the vector addition of the two sine wave input signals. A detector and a suitable filtering network are usually employed with such transformers to develop a direct-current voltage whose magnitude is representative of the relative phase between the two input sine waves. Such phase discriminators are generally expensive due to the cost of the transformers employed. Also, the accuracy of such phase discriminators is dependent upon the amplitude as well as the waveform of the input signals. The proper operation of such phase discriminators requires that the input waveforms be reasonably sinusoidal and that the amplitudes of the input signals do not vary arbitrarily. Furthermore, these prior art discriminators require considerable power from the input signal sources.

It is an object of the present invention to provide an improved phase discriminator that is relatively insensitive to the waveform of the two input electric waves.

It is a further object of the present invention to provide a phase discriminator that is relatively inexpensive to manufacture and that provides an accurate indication of the relative phase relationship between two electric waves.

It is a still further object of the present invention to provide an improved phase discriminator that is relatively insensitive to the waveform of the input signals and that has high impedance input circuits to prevent loading of the input signal sources.

In accordance with the present invention, a phase discriminator is provided which develops an output signal indicative of the phase relationship between a first and a second electric wave. This phase discriminator includes a first and a second pair of input terminals across which the first and second electric waves are to be applied respectively. An adding network is connected across the first and second pairs of input terminals for developing an output signal representative of the addition of the first and second waves. A first differentiating means, including an output circuit, is connected to the first pair of terminals for developing a signal in the output circuit thereof which is representative of the derivative with respect to time of the first wave. A second differentiating means, including an output circuit, is connected to the second pair of input terminals for developing a signal across the output circuit thereof which is representative of the derivative with respect to time of the second wave. First gating means, including clipping means, are coupled between the output circuit of the first differentiating means and the adding network for clipping a portion of the output signal from the first differentiating means having a predetermined polarity and for comparing the resulting signal from the first differentiating means having the opposite of the predetermined polarity with the signal developed in the adding network, whereby an output signal will be developed in the first gating means when a portion of the signal representative of the derivative of the first wave having the opposite polarity is coincident with a portion of the signal developed in the adding network having this opposite polarity. Second gating means including clipping means, are coupled between the output circuit of the second differentiating means and the adding network for clipping a portion of the signal developed in the second differentiating means having the opposite polarity and for comparing the resulting output signal from the second differentiating means having the predetermined polarity with the signal developed in the adding network, whereby an output signal will be developed in the second gating means when a portion of the signal representative of the derivative of the second wave having the predetermined polarity is coincident with a portion of the signal developed in the adding network having this predetermined polarity.

The novel features which are believed to be characteristic of the invention both as to its organization and method of operation, together with the further objects and advantages thereof, will be better understood from the following description considered in connection with the accompanying drawings in which:

Fig. 1 is a schematic circuit diagram of one embodiment of a phase discriminator employing the principles of the present invention;

Fig. 2 is a graph illustrating waveforms taken at various points in the circuit of Fig. 1;

Fig. 3 is a schematic circuit diagram of another embodiment of a phase discriminator in accordance with the present invention; and Fig. 4 is a graph illustrating waveforms taken at various points in the circuit of Fig. 3.

Referring now to the drawings, and more particularly to Fig. 1, there is shown a phase discriminator for determining the relative phase relationship between two input waveforms that have steep leading edges such as square waves, and have the same frequency. Two pairs of input terminals 10 and 11, one terminal of each being connected to ground, are adapted to receive the two electric waves whose relative phase relationship is to be determined. A phase inverter 12 is connected to the non-grounded terminal of the pair of input terminals 11. The phase inverter 12 has an output terminal connected to a terminal point B. An adding network consisting of three resistors 13, 14 and 15 is connected to the input terminals 10 and to the point B for deriving the sum of the electric waves that are applied across the input terminals 10 and the point B and ground. To this end the resistors 13 and 15 are serially connected between the non-ground terminal of the input terminals 10, and ground and the resistor 14 is connected to the output terminal of the phase inverter 12 or to the point B and the junction of the resistors 13 and 15 or the point C. This type of adding network is well known in the art.

A first differentiating means, including a capacitor 16 and a resistor 17, is connected between the non-grounded terminal of the input terminals 10 or point A and ground. As is shown, the capacitor 16 and the resistor 17 are connected in series between the point A and ground. The output signal from the first differentiating means is developed across the resistor 17. A first clipping diode 18 is connected between the junction of the resistor 17 and the capacitor 16 which is designated point D and ground for clipping the negative portion of the signal developed across the resistor 17. First gating means are connected between the point D or the output circuit of the first differentiating means and the adding network for comparing the signal developed in this output circuit with the signal developed across the resistor 15. This first gating means or network includes a pair of semiconductor diodes 20 and 21. As is shown, the cathode of the diode 20 is connected to the point D and the anode thereof is connected to the cathode of the diode 21 or to the point E. The cathode of the diode 21 is connected to the junction of the resistors 13, 14 and 15 or point C.

A load resistor 22 is connected between the point E and the positive terminal of a suitable source of direct current potential such as a battery 23 for providing a positive voltage at the anodes of the diodes 20 and 21. The battery 23 may include an intermediate tap as is shown with the tap being grounded. The positive voltage provided by this battery renders each of the diodes 20 and 21 normally conducting. A pair of output terminals 24, one of which is connected to the point E and the other to ground is provided for translating an output signal to external circuitry, not shown.

The remaining portion of the circuit of Fig. 1 is similar to that just described and includes a second differentiating means connected to the point B for differentiating the signal appearing in the output circuit of the phase inverter 12. This second differentiating means consists of a capacitor 25 and a resistor 26 serially connected in that order between the point B and ground. This second differentiating means is also provided with an output circuit which includes the point F and ground. A clipping diode 27 is connected across the output circuit of the second differentiating means for clipping the positive portion of the signal developed across the resistor 26. As is shown, the anode of this diode is connected to the point F and the cathode thereof is connected to ground. A second gating means, including a pair of diodes 28 and 30, is connected between the adding network and the output circuit of the second differentiating means. The anode of the diode 30 is connected to the junction of the resistors 13, 14 and 15 and the cathode thereof is connected to the cathode of the diode 28 or to point G. The anode of the diode 28 is connected to the point F. A load resistor 31 is connected between the negative terminal of the battery 23 and the junction of the diodes 28 and 30 for supplying a negative potential to the anodes of these diodes and thereby rendering these diodes normally conducting. A second pair of output terminals 32, one of which is connected to the point G, the other to ground, is provided to couple the output signal that is developed across the resistor 31 to suitable external circuitry, not shown.

In discussing the operation of the circuit of Fig. 1, reference is now made to Fig. 2 wherein the abscissa represents time and the ordinate voltage. The curve A' represents the voltage waveform of the input signal at the terminals 10 and the curve B' represents the inverted voltage waveform of the input signal at the terminals 11 or the signal present between the point B and ground. The curves C', D' and F' were taken by measuring the voltage between the point C, D, and F and ground. The remaining curves H, I and J in Fig. 2 relate to voltages taken at various points of the circuit of Fig. 1 when the input signal to the terminals 10 is lagging the input signal to the terminals 11. These latter curves will be discussed later.

Referring now to Fig. 2, the input signal 34 in the curve A' to the terminals 10 is illustrated as a square wave varying between zero and some positive potential. The signal 35 in the curve B' represents the signal applied between the point B and ground which is, of course, also representative of the signal that is applied to the terminals 11 in inverted form. The signal 35 is also illustrated as a square wave varying between zero and a negative potential having a magnitude substantially equal to the magnitude of the positive portion of the input signal 34. As is shown, the input wave to the terminals 10 leads the input wave to terminals 11.

The input wave at the terminals 10 is added with the wave that is applied between the point B and ground in the adder network consisting of the resistors 13, 14 and 15 and the sum of these waves is developed across the resistor 15 or between point C and ground (see curve C'). The addition of these two electric waves results in a series of positive pulses 42 and negative pulses 43 as is shown in the curve C'. The width of these positive and negative signals will obviously depend upon the phase relationship of the input signals to the phase discriminator. When the input signals are in phase, that is, when the leading edge 36 of the signal 34 in curve A coincides with the leading edge 37 of the signal 35 in the curve B, the signal appearing at the point C' will be zero since the two signals appearing at the points A and B will be of equal amplitude and opposite polarity thereby providing a zero sum. When the input waves are 180 degrees out of phase, the signal appearing at the point C will be a square wave varying between the positive potential level of the input signal to the terminals 10 and the negative potential level of the wave appearing at the point B. Between these two limits the signal appearing at the point C will consist of alternative positive and negative pulses with a zero voltage level occurring between the pulses.

The first differentiating means consisting of the capacitor 16 and the resistor 17 differentiates the leading and trailing edges of the square wave input to the terminals 10. The derivative with respect to time of the leading edge of the input signal 34 appears as a pulse 41 in the curve D'. The clipping diode 18 operates to clip the derivative with respect to time of the lagging edge 40 of the input signal 34. Thus, the signal appearing between the point D and ground is a series of positive pulses as is illustrated in the curve D'.

The first gating network consisting of the diodes 20 and 21 compares the signal appearing between the point D and ground with the signal appearing in the output of the adding network or between the point C and ground. As is illustrated, the positive pulses 41 appearing at the point D coincide with a portion of the positive pulse 42 appearing at the point C and during the coincidence of these two pulses, a positive output signal is developed across the resistor 22 and thus between the point E and ground. This positive output signal is, of course, similar in waveform to the pulses 41 and appears across the output terminals 24 to indicate that the input wave to the terminals 10 is leading the input wave to the terminals 11.

The second differentiating network operates in the same manner as the first differentiating network and develops the derivative with respect to time of the square wave that is applied between the point B and ground. Since this is a negative going signal, the derivative with respect to time of the leading edge 37 of the signal 35 is a negative pulse 44 (see curve F'). Again, the derivative with respect to time of the positive going portions of the signal 35 will be clipped by the clipping diode 27. The second gating means consisting of the diodes 28 and 30 compare this negative pulse 44 with the signal developed across the resistor 15. Since the pulse 44 does not coincide with the negative going portion 43 of the signal 39, no signal is developed across the load resistor 31 or coupled to the output terminals 32. Thus, as long as the input wave to the terminals 10 leads the input wave to the terminals 11, no signal will be developed across the output terminals 32.

The curves H, I and J of Fig. 2 illustrate several voltage waveforms taken at various points on the circuit of Fig. 1 when the input electric wave to the terminals 11 leads the input electric wave to the terminals 10. The curve H illustrates the waveforms that are applied between the point A and ground and the point B and ground superimposed on each other. In this case the waveform 50 represents the input signal between the point A and ground and the waveform 51 represents the signal applied between the point B and ground. Curve I represents the voltage appearing between the point C and ground or across the summing resistor 15 which is, of course, the addition of the waveforms 50 and 51. The curve J represents the pulses appearing between the point D and ground and the point F and ground. The reference numeral 53 represents the signal between the point D and ground and the reference numeral 54 represents the signal between the point F and ground. Under these circumstances, the signal 54 is coincident with a negative portion of the signal 52 and therefore an output signal is developed between the point G and ground or across the output terminals 32 and no signal is developed across the output terminals 24 since the signal 53 does not coincide with the positive portion of the output signal from the adding network.

It is to be understood that while the input electric waves to the circuit of Fig. 1 have been illustrated as square waves, the input signals could have other waveforms provided that the amplitudes of the waves applied to the input terminals 10 and 11 are substantially equal and provided that the leading edges of the input waves have fast rise times. It is, of course, necessary that the input waves have steep leading edges or fast rise times, to insure that the differentiated pulses 41 and 44 or 53 and 54 are accurately located with respect to the point where the input waves depart from or cross the zero voltage axis. Since the differentiated portions of the lagging edges of the input waveforms are clipped, it is unimportant whether or not such lagging edges have fast fall times.

The circuit shown in Fig. 3 represents another embodiment of the present invention for comparing the relative phase of two input waves such as sine waves and providing high impedance input circuits to the discriminator to prevent loading of the input signal sources.

Referring now to Fig. 3, there is shown a phase discriminator which includes two pairs of input terminals 70 and 72 across which the two electric waves whose relative phase relationship is to be determined are applied. One terminal of each of the pairs of input terminals 70 and 72 is connected to ground. A semiconductor diode 73, a resistor 74, and a battery 75 are connected in series in that order between the non-grounded terminal of the input terminals 70, designated K, and ground. The anode of the diode 73 is connected to the terminal K and the cathode thereof is connected to the resistor 74. This diode 73 translates only the positive portions of the electric wave applied to the input terminals 70. Another semiconductor diode 76 has its cathode connected to the junction of the diode 73 and the resistor 74 and its anode connected to one terminal of a biasing resistor 77, the other terminal of which is connected to the positive terminal of a battery 78. A clamping diode 86 has its anode connected to ground and its cathode connected to the anode of the diode 76 to clamp the junction of the resistor 77 and the diode 76 at a small negative potential with respect to ground. The values of batteries 78 and 75 and the values of the resistors 77 and 74 are chosen to maintain the diode 86 conducting in the absence of a positive input signal to the input terminals 70.

An amplifying and clipping transistor 80 of the NPN junction type having an emitter electrode 81, a collector electrode 82 and a base electrode 83 is provided for amplifying and clipping the signal that is developed at the anode of the diode 76 as a result of this diode being rendered non-conducting. As is shown, the base 83 is connected to the anode of the diode 76, the emitter 81 is connected to ground, and the collector 82 is connected to the battery 78 by means of a resistor 85.

Similarly, a semiconductor diode 90, a resistor 91 and a battery 92 are connected in series in the order named between the non-grounded terminal of the input terminals 72, designated L, and ground. The diode 90 has its cathode connected to the terminal L for translating only the negative portions of the input wave that is applied to the terminals 72. Another semiconductor diode 93, a biasing resistor 94 and a battery 95 are connected in series in that order between the anode of the diode 90 and ground. As is shown, the anodes of the diodes 90 and 93 are connected together and the cathode of the diode 93 is connected to the resistor 94. An amplifying and clipping transistor 97 of the PNP junction type having an emitter 98, a collector 99 and a base 100 is provided to amplify and clip the signal that is developed at the cathode of the diode 93. The base 100 is connected to the cathode of the diode 93, the emitter 98 is connected to ground, and the collector 99 is connected to the battery 95 by means of a resistor 101.

An adding network consisting of three resistors 103, 104 and 105 is connected to the collectors 82 and 99 for summing the voltages developed at these collectors. The resistors 103 and 104 are connected in series in the order named between the collector 82 and ground, and the resistor 105 is connected between the collector 99 and the junction of the resistors 103 and 104. The output signal of this adding network is developed across the resistor 104.

A first time delay means, consisting of a variable resistor 108 and a variable capacitor 110 connected in series between the input terminal K and ground, is employed to delay the signal that is applied across the input terminals 70. The values of the resistance and capacitance of the delay elements 108 and 110 can be varied to control the time that the input signal is delayed. A semiconductor diode 111, a resistor 112 and a battery 110 are connected in series in that order between the junction of the resistor 108 and the capacitor 110 and ground. The diode 111 has its anode connected to the junction of the resistor 108 and the capacitor 110 and its cathode connected to the resistor 112. Another semiconductor diode 114, a biasing resistor 115 and a battery 116, are connected in series in the order named between the cathode of the diode 111 and ground. The cathode of the diode 114 is connected to the cathode of the diode 111. The positive terminal of the battery 116 is connected to the resistor 115 and the negative terminal of this battery is grounded. A clipping and amplifying transistor 118 of the NPN junction type, including an emitter 120, a collector 121 and a base 122 is provided for clipping and amplifying the signal that is developed at the anode of the diode 114. As is shown, the base 122 is connected to the anode of the diode 114, the emitter is connected to ground, and the collector is connected to the battery 116 through a resistor 123. A clamping diode 124 has its cathode connected to the base 122 and its anode connected to ground for clamping the base 122 at a small positive potential with respect to ground. This amplifying and clipping transistor 118 functions in the same manner as the transistors 80 and 97 and provides a rectangular, or as the case may be, a square wave output signal at its collector 121 in response to a sufficient positive signal applied across its base-emitter junction to saturate the transistor.

A first differentiating network, including a capacitor 125 and the base-emitter circuit resistance of a transistor 126, is coupled to the collector 121 for differentiating the signal developed at this collector. The transistor 126 is of the PNP junction type and includes an emitter 127, a collector 128 and a base 130. The capacitor 125 is connected between the collector 121 and the base 130. A battery 131 and a voltage divider resistor 132 is connected between ground and the base 130 in the order named for providing base bias for the transistor 126. Another voltage divider resistor 133 is connected between the base 130 and ground to complete the base bias circuit of the transistor 126. The collector 128 is energized from a suitable negative source of energizing potential which may be a battery 134, and the emitter 127 is coupled to ground through an emitter resistor 135. Emitter bias for the transistor 126 is provided by means of a positive source of energizing potential 137 and a biasing resistor 138 which are connected in series in that order between ground and the emitter 127.

A first gating means consisting of a pair of semiconductor diodes 140 and 141 is connected between the adding network and the emitter 127 of the transistor 126 for comparing the signal developed at this emitter 127 with the signal developed across the resistor 104 of the adding network. As is shown, the diodes 140 and 141 have their cathodes connected together, the anode of the diode 140 is connected to the emitter 127 and the anode of the diode 141 is connected to the junction of the resistors 103, 104 and 105. A suitable negative source of energizing potential illustrated as a battery 142, is coupled to the cathodes of the diodes 140 and 141 through a resistor 143 to bias these diodes in the forward direction and thereby render them conducting. A pair of output terminals 144 are coupled to the anodes of the diodes 140 and 141 for translating the signal developed at this first gating network with suitable external circuitry, not shown.

The remaining portion of the circuitry of Fig. 3 is similar to that just described and performs the function of delaying, clipping, amplifying, differentiating and gating the signal applied across the input terminals 72. To delay the signal applied across the input terminals 72, a second time delay network is provided which consists of a variable resistor 150 and a variable capacitor 152 connected in series in that order between the nongrounded terminal of the input terminal 72 and ground. A semiconductor diode 154, a resistor 155 and a battery 156, are connected in series in that order between the junction of the resistor 150 and the capacitor 152 and ground. Another diode 157, a biasing resistor 158 and a battery 160, are connected in series in that order between the junction of the diode 154 and the resistor 155 and ground. As is shown, the anodes of the diodes 154 and 157 are connected together, the cathode of the diode 154 being connected to the capacitor 152, and the cathode of the diode 157 being connected to the resistor 158. An amplifying and clipping transistor 162 of the PNP junction type, having an emitter electrode 163, a collector electrode 164 and a base electrode 165 is provided for clipping and amplifying the signal developed at the cathode of the diode 157. The base 165 is connected to the cathode of the diode 157, the emitter 163 is connected to ground, and the collector 164 is connected to the negative terminal of the battery 160 through a load resistor 166. A clamping diode 167 has its anode connected to the base 165 and its cathode connected to ground for clamping the base 165 at a small positive potential with respect to ground.

A second differentiating means consisting of a capacitor 170 and the base-emitter circuit of a transistor 171 of the NPN junction type is coupled to the collector 164 for differentiating the signal developed at this collector. The transistor 171 includes an emitter 172, a collector 173 and a base 174. The capacitor 170 is connected in series between the collector 164 and the base 174. A pair of voltage divider resistors 175 and 176 are connected to the base 174, the resistor 175 being connected to ground and the resistor 176 is connected to the negative terminal of a battery 178 for providing the necessary base bias for the transistor 171. The emitter 172 is coupled to ground through an emitter resistor 180 and the collector 173 is coupled to the positive terminal of a battery 181 through a voltage divider resistor 182. Another voltage divider resistor 183 is connected between the collector 173 and ground for providing the proper operating potential at the collector 173. Emitter bias for the transistor 171 is furnished from a negative source of energizing potential or battery 185 through a resistor 186.

A second gating network consisting of a pair of semiconductor diodes 187 and 188 are coupled between the adding network consisting of the resistors 103, 104 and 105 and the emitter 172 for comparing the signal developed in the adding network with the signal developed at the emitter of the transistor 171. The collectors of the diodes 187 and 188 are connected together. The cathode of the diode 187 is connected to the emitter 172, and the cathode of the diode 188 is connected to the junction of the resistors 103, 104 and 105. The positive terminal of a battery 190 is connected to the anodes of the diodes 187 and 188 through a biasing resistor 191. This second gating network functions in a similar manner to the first gating means in that the battery 190 renders the diodes 187 and 188 conducting. A pair of output terminals 192 are coupled to the anodes of the diodes 187 and 188 for transferring the signal developed at these anodes to suitable external circuitry, not shown.

The circuit of Fig. 3 operates in a manner similar to the circuit of Fig. 1; however, the circuit of Fig. 1 requires that the input electric waves have substantially equal amplitudes and fast rise times as has been pointed out above. This requirement is not true for the circuit shown in Fig. 3 since sine waves or other types of electric waves may be applied to the input terminals 70 and 72. Since the input circuits to the phase discriminator shown in Fig. 3 clip and amplify the input waves, it is unnecessary that the input waves to the terminals 70 and 72 have equal amplitudes or even fast rise times.

The phase discriminator disclosed in Fig. 1 will load the input signal sources since these sources must supply the entire power that is required for the discriminator. The circuit of Fig. 3, on the other hand, requires little power from the input signal sources, the power for operating the phase discriminator being supplied by the transistors and their associated power supplies. The advantages of the circuit disclosed in Fig. 1 are, of course, its simplicity and the relatively low manufacturing cost. While the advantages to the circuit disclosed in Fig. 3 are, of course, its independence upon the waveform of the input signal, its high impedance input circuits which prevent loading of the input signal sources and the accuracy of the phase discrimination.

In discussing the operation of the circuit of Fig. 3, reference will be made to Fig. 4 wherein the waveforms of voltages taken at various points of the circuit of Fig. 3 are shown. The input signals include the curve 200 which represents the input electric wave applied to the terminals 70 and the curve 202 which represents the input electric wave applied to the input terminals 72. As is illustrated in Fig. 4, the two input waves have a phase difference of $\theta_1+180°$ with the wave 200 leading the wave 202.

At time $t_1$, assume that each of the input signals to the terminals 70 and 72 is zero. At this time the diode 76 is biased in the forward direction as a result of its anode being biased positive with respect to its cathode by the batteries 78 and 75. The values of the batteries 78 and 75 and the resistors 77 and 74 are chosen to allow the diode 86 to clamp the voltage at the base of the transistor 80 at a small negative potential with respect to ground. The base 83 is thus maintained at a small negative potential with respect to the emitter 81 of the transistor 80 and thus transistor 80 is nonconducting at this time.

The batteries 92 and 95 and the resistors 91 and 94 also forward bias the diode 93 at this time and maintain the cathode of the diode 93 at a positive potential with respect to ground. The diode 96 clamps the base 100 of the transistor 97 at a small positive potential with respect to ground and thereby renders the transistor 97 nonconducting. Hence, at time $t_1$ the transistors 80 and 97 are nonconducting. The operation of the transistors 118 and 162 is similar to that of the transistors 80 and 97.

In regard to the transistor 118, the diode 114 is forward biased and a negative potential is impressed on the base 122 which in turn back biases the base-emitter junction of the transistor 118. Also, the clamping diode 124 clamps the base 122 at a small negative potential. The transistor 162 is also rendered nonconducting at this time by the action of the batteries 156 and 160, the resistors 155 and 158 and the forward biased diode 157. The clamping diode 167 clamps the base 165 at a small positive potential.

The transistors 126 and 171 have their base-emitter junctions biased in the reverse direction in the absence of a signal of proper polarity being translated through the capacitors 125 and 170 respectively. Thus, all the transistors are nonconducting when the input signals to the phase discriminator are zero.

Shortly after time $t_1$ the positive going input wave 200 biases the diode 73 in the forward direction and places a positive potential with respect to ground at the cathode of the diode 76. This positive potential biases the diode 76 in the reverse direction and causes the base 83 to go positive with respect to ground which in turn biases the base-emitter junction of the transistor 80 in the forward direction and renders this transistor conducting. The current supplied to the base 83 by the battery 78 during the time that the input signal 200 is positive with respect to ground is sufficiently large to saturate the transistor 80 and provide a rectangular pulse at the collector 82 having a fast rise and fall time. Thus, the transistor 82 functions not only to amplify the positive portion of the input signal to the terminals 70, but also to clip this signal and provide a rectangular, or as the case may be, a square wave output signal at the collector 121.

The transistor 97 and its associated circuitry perform a function similar to that performed by the transistor 82 and amplifies and clips the negative portion of the input signal to the terminals 72. Shortly after time $t_3$ the input signal 202 goes negative with respect to ground and biases the diode 93 in the reverse direction. This causes the base 100 to go negative with respect to the emitter 98 which in turn renders the transistor 97 conducting. The transistor 97 saturates and thereby provides a rectangular or square wave output signal as the case may be, at the collector 98.

The curve M represents the signals at the collectors 82 and 99. The pulses designated by the reference numeral 204 represent the signals developed at the collector 82, and the pulses 206 represent the signals developed at the collector 99. As can be seen, the signal 204 is inverted with respect to the input signal 200 and the signal 206 is inverted with respect to the input signal 202 due to the 180 degree phase inversion of the collector electrode voltage with respect to the base electrode voltage of the transistors 80 and 97.

When the input wave 200 crosses the zero axis and goes negative with respect to ground, the diode 76 is again rendered conducting and the batteries 78 and 75 drive the base 83 to a negative potential with respect to ground thereby rendering the transistor 80 nonconducting. Similarly, when the input wave 202 goes positive with respect to ground, the transistor 97 is rendered nonconducting.

The operation of the remaining portion of the circuit of Fig. 3 will now be explained. The input signal or wave 200 is delayed in time a value of $\theta_2$ by the resistor 108 and the capacitor 110. Reference is made to curve O which represents the signals across the capacitors 110 and 152, or the input waves 200 and 202 delayed by $\theta_2$ respectively. The wave 212 corresponds to the signal across the capacitor 110 and the wave 214 represents the signal across the capacitor 152.

At time $t_2$ the signal 212 goes positive with respect to ground and thereby biases the diode 111 in the forward direction. This causes the diode 114 to be biased in the reverse direction thereby permitting the battery 116 to drive the base 122 positive with respect to ground and thus the transistor 118 is rendered conducting shortly after time $t_2$. This transistor amplifies and clips the signal 212 in the same manner that the transistor 80 clips and amplifies the signal 200. The signal developed at the collector 121 is illustrated by the negative pulses 216 on the curve P, which represents the voltages taken between the collector 121 and ground and the collector 164 and ground. The positive pulses 218 on this curve represent the signal at the collector 164. The negative pulses 216 are differentiated by the RC network consisting of the capacitor 125 and the forward biased base-emitter resistance of the transistor 126. The collector 121 goes negative as a result of the transistor 118 being rendered conducting, and the capacitor 125 translates this negative signal to the base 130 and thereby renders the transistor 126 conducting. The signal at the emitter 127 of the transistor 126 represents the derivative with respect to time of the leading edge of the signal 216. When the signal 216 goes positive, the base-emitter junction of the transistor 126 is biased in the reverse direction and thus transistor 126 develops only a negative signal at the emitter 127 designated by 220 on the curve Q.

At time $t_4$ the signal 214 that is impressed across the capacitor 152 goes negative with respect to ground and biases the diode 154 in a forward direction. This in turn biases the diode 157 in the reverse direction and applies a negative potential at the base 165 with respect to ground. Thus, the transistor 162 is rendered conducting shortly after time $t_4$ and amplifies and clips the signal developed at the base 165 to provide a rectangular or square wave output signal at the collector 164 which is illustrated as the positive pulses 218 on the curve P. The leading edges of the positive pulses 218 are differentiated by the capacitor 170 and the base-emitter junction of the transistor 171 to produce a series of positive pulses at the emitter 172 which are designated by the reference numeral 222 on the curve R.

The signals developed at the emitters 127 and 172 are gated or compared with the signals 208 and 210 in the curve N across the resistor 104 by means of the first and second gating means. The diode 140 of the first gating means is normally conducting as a result of being forward biased by the negative source of potential 142. The diode 141 is also forward biased by this negative source 142. The negative signal 220 at the emitter 127 drives the anode of the diode 140 negative. This occurs at time $t_2$. At this same time, the negative pulse 208 across the resistor 104 drives the anode of the diode 141 in the negative direction. This causes a negative signal to be applied across the output terminals 144 by the battery 142 and the resistor 143.

At time $t_4$ the positive pulses 222 that are developed at the emitter 172 bias the diode 187 in the reverse direction. However, at this time the diode 188 is biased in the forward direction due to the absence of signal across the resistor 104 (see curve N). Thus the phase discriminator of Fig. 3 provides an output pulse across the terminals 144 when the input wave to the terminals 70 leads the input wave to the terminal 72 by an amount greater than $\theta_2$. Of course, when the phase difference between the input waves to the phase discriminator is less than the time $\theta_2$, no output signals will be developed at either of the terminals 144 or 192 since at this time neither the negative pulses 200 nor the positive pulses 222 will coincide with the signals developed across the resistor 104.

As has been pointed out before, this time $\theta_2$ can be varied by changing the values of the resistors 108 and 150 and the capacitors 110 and 152. Thus the phase discriminator of Fig. 3 can be made as sensitive as desired within the limits of the inherent phase delay in the transistors 118, 126, 162 and 171 and their associated circuitry.

While the transistors 80, 118 and 171 have been illustrated as NPN type transistors, they might be replaced by transistors of the PNP type with appropriate changes in the bias sources, input signal polarities, and other circuit components such as the various diodes. Similarly, transistors 97, 126 and 162 may be replaced with PNP type transistors.

There has thus been disclosed an improved phase discriminator which provides a pulse type output signal that is indicative of the phase relationship of two electric waves. In one embodiment a phase discriminator employing the principles of the present invention has been illustrated with a minimum number of components which is relatively insensitive to the waveforms of the two input waves. Another embodiment provides a phase discriminator that is also insensitive to the waveform of the input signals and that provides a high impedance to the input signal sources and a very accurate indication of the relative phase of the input signals.

What is claimed is:

1. A phase discriminator for determining the phase relationship of a first and a second electric wave, each of said waves having steep leading edges and substantially equal amplitudes, said phase discriminator comprising: a first and a second pair of input terminals across which said first and second waves are to be applied respectively; an adding network connected across said first and second pairs of input terminals for developing an output signal representative of the addition of said first and second waves; first differentiating means including a first input and a first output circuit, said first input circuit being connected to said first pair of input terminals for developing a first differentiated wave in said first output circuit representative of the derivative with respect to time of said first wave; second differentiating means including a second input and a second output circuit, said second input circuit being connected to said second pair of input terminals for developing a second differentiated wave in said second output circuit representative of the derivative with respect to time of said second wave; first gating means including clipping means coupled between said first output circuit and said adding network for clipping a portion of said first differentiated wave having a predetermined polarity and for comparing said first differentiated wave having the opposite of said predetermined polarity with the output from said adding network, whereby an output signal will be developed in said first gating means when a portion of said first differentiated wave having said opposite polarity is coincident with a portion of the output from said adding network having said opposite polarity; and second gating means including clipping means coupled between said second output circuit and said adding network for clipping a portion of said second differentiated wave having said opposite polarity and for comparing the output from said adding network with said second differentiated wave having said predetermined polarity, whereby an output signal will be developed in said second gating means when a portion of said second differentiated wave having said predetermined polarity is coincident with a portion of the output developed in said adding network having said predetermined polarity.

2. A phase discriminator for determining the phase relationship of two waves having opposite polarities, steep leading edges and substantially equal amplitudes, said phase discriminator comprising: an adding network having a first and second input circuit; means for applying one of said waves to said first input circuit; means for applying the other of said waves to said second input circuit, said adding network producing an output signal representative of the addition of said two waves; first differentiating means connected to said first input circuit for differentiating said one wave; second differentiating means connected to said second input circuit for differentiating said other wave, each of said differentiating means including an output circuit; clipping means coupled individually to each of the output circuits of said first and second differentiating means for clipping a portion of said differentiated waves; first gating means coupled between said adding network and the output circuit of said first differentiating means for producing an output signal when the differentiated wave developed in said differentiating means and having a predetermined polarity is coincident with a portion of the output signal from said adding network having said predetermined polarity; and second gating means coupled between said adding network and the output circuit of said second differentiating means for producing an output signal when a portion of the differentiated wave developed in said differentiating means and having the opposite of said predetermined polarity is coincident with a portion of the signal developed in said adding network having said opposite polarity.

3. A phase discriminator for determining the phase relationship of first and second rectangular waves having substantially equal amplitudes, said phase discriminator comprising: first and second pairs of input terminals; means for applying said first rectangular wave across said first pair of input terminals; means for applying said second rectangular wave across said second pair of input terminals; an adding network connected across said first and second pairs of input terminals and having an output circuit for establishing a signal across said output circuit representative of the addition of said first and second rectangular waves; first differentiating means connected to said first pair of input terminals for differentiating said first rectangular wave, said first differentiating means including an output circuit; first asymmetrically conductive means connected to the output circuit of said first differentiating means for clipping a portion of the differentiated wave developed in said first differentiating means having a predetermined polarity; second differentiating means connected to said second pair of input terminals for differentiating said second rectangular wave, said second differentiating means including an output circuit; second asymmetrically conductive means connected to the output circuit of said second differentiating means for clipping a portion of the differentiated wave developed in said second differentiating means having the opposite of said predetermined polarity; first gating means coupled between said adding network and the output circuit of said first differentiating means for developing an output signal when the differentiated wave developed in said first differentiating means and having said opposite polarity is coincident with a portion of the output signal from said adding network having said opposite polarity; and second gating means coupled between said adding network and the output circuit of said second differentiating means for developing an output signal when a portion of the differentiated wave developed in said second differentiating means having said predetermined polarity is coincident with a portion of the signal developed in said adding network having said predetermined polarity.

4. A phase discriminator for determining the phase relationship of first and second electric waves comprising: first and second pairs of input terminals across which said first and second waves are to be applied respectively; first gating means connected to said first pair of input terminals for translating a portion of said first wave having a predetermined polarity; second gating means connected to said second pair of input terminals for translating a portion of said second wave having the opposite of said predetermined polarity; first clipping means connected individually to each of said first and second gating means for clipping a portion of said first and second waves; an adding network connected across said first clipping means and having an output circuit for establishing a signal across the output circuit thereof representative of the addition of the waves developed in said clipping means; first time delay means connected to said first pair of input terminals for delaying said first wave; second time delay means connected to said second pair of input terminals for delaying said second wave; third and fourth gating means coupled to said first and second time delay means respectively for translating a portion of said first and second waves, said third gating means being adapted to translate a portion of said first wave having said predetermined polarity and said fourth gating means being adapted to translate a portion of said second wave having said opposite polarity; third and fourth clipping means, each of said third and fourth clipping means having an output circuit, said third clipping means being connected to said third gating means for clipping a portion of the signal developed in said third gating means to establish a signal in the output circuit of said third gating means having a steep leading edge, said fourth clipping means being connected to said fourth gating means for clipping a portion of the signal developed in said fourth gating means to establish a signal in the output circuit of said fourth clipping means having a steep leading edge; first differentiating means connected to the output circuit of said third clipping means for developing a first differentiated signal representative of the derivative with respect to time of the leading edge of the signal established in the output circuit of said third clipping means; second differentiating means connected to the output circuit of said fourth clipping means for developing a second differentiated signal representative of the derivative with respect to time of the leading edge of the signal established in the output circuit of said fourth clipping means; fifth gating means connected between said adding network and said first differentiating means for developing an output signal when a portion of said first differentiated signal and a portion of the output signal from said first adding network having the same polarity are coincident; and sixth gating means coupled between said adding network and said second differentiating means for developing an output signal when a portion of said second differentiated signal and a portion of the signal developed in said adding network having the same polarity are coincident.

5. A phase discriminator as defined in claim 4 wherein each of said gating means includes a pair of semiconductor diodes having like electrodes connected together, the diodes of said first, third and fifth gating means having one of the electrodes connected together and the diodes of said second, fourth and sixth gating means having the other of the electrodes connected together.

6. A phase discriminator as defined in claim 4 wherein each of said gating means includes a pair of semiconductor diodes, said first clipping means includes first and second transistors, said first transistor being connected between said first gating means and said adding network and adapted to saturate in response to the application of said first wave of said predetermined polarity to said discriminator, said second transistor being connected between said second gating means and said adding network and adapted to saturate in response to the application of said second wave of said opposite polarity to said discriminator, said first and second time relay means each include a resistor and a capacitor connected in series relationship, said third and fourth gating means being connected to the junction of the resistors and capacitors of said first and second time delay means respectively, said third and fourth clipping means each include a transistor, the transistor of said third clipping means being adapted to saturate in response to a signal being developed in said third gating means, the transistor of said fourth clipping means being adapted to saturate in response to a signal being developed in said fourth gating means, said first and second differentiating means each include a capacitor and a transistor having a base, an emitter and a collector electrode, the capacitor of each of the differentiating means being connected in series relationship with the base and emitter electrodes of the transistor of the respective differentiating means.

References Cited in the file of this patent
UNITED STATES PATENTS

| | | |
|---|---|---|
| 2,576,026 | Meacham | Nov. 20, 1951 |
| 2,644,133 | Soukaras | June 30, 1953 |
| 2,702,852 | Briggs | Feb. 22, 1955 |

UNITED STATES PATENT OFFICE
CERTIFICATE OF CORRECTION

Patent No. 2,900,534                      August 18, 1959

William T. Chater

It is hereby certified that error appears in the printed specification of the above numbered patent requiring correction and that the said Letters Patent should read as corrected below.

Column 4, line 28, for "alternative" read -- alternate --; column 14, line 19, for "relay" read -- delay --.

Signed and sealed this 1st day of March 1960.

(SEAL)

Attest:

KARL H. AXLINE

Attesting Officer

ROBERT C. WATSON
Commissioner of Patents